March 24, 1970  L. W. WELLS  3,502,411
OPTICAL STEP PRINTER
Filed April 21, 1967  3 Sheets-Sheet 2

INVENTOR.
LEON W. WELLS
BY
*Lyon & Lyon*
ATTORNEYS

INVENTOR.
LEON W. WELLS ent Office 3,502,411
Patented Mar. 24, 1970

3,502,411
OPTICAL STEP PRINTER
Leon W. Wells, Closter, N.J., assignor to Panopix
Research Inc., New York, N.Y., a corporation of
New York
Filed Apr. 21, 1967, Ser. No. 632,682
Int. Cl. G03b 27/44
U.S. Cl. 355—54                    5 Claims

ABSTRACT OF THE DISCLOSURE

A projector arranged to project successive frames from conventional moving picture film having a single row of picture frames arranged crosswise thereon onto a wider film to form multiple longitudinal parallel rows thereon with all frames extending longitudinally. The conventional film extends and always moves vertically downwardly while the wider film extends and moves horizontally so that successive frames in each row are side by side. After each row is exposed on the wide film its direction of movement is reversed and it is stepped upwardly to receive another row of exposures parallel to and immediately below the previous row but with the action progressing in the opposite direction.

CROSS REFERENCES TO RELATED APPLICATIONS

This invention relates to an optical printer for printing picture frames on a film of the type fully disclosed and claimed in my copending application Ser. No. 619,499, filed Feb. 6, 1967. That film is for use in a projector of the type disclosed in my copending application Ser. No. 541,196, filed Apr. 8, 1966.

FIELD OF THE INVENTION

This invention relates to an apparatus for projecting successive frames from a conventional film having one row of frames thereon to a second film and rearranging the frames to print a plurality of rows on the second film with the direction of the depicted action being rearranged thereon.

SUMMARY OF THE INVENTION

In brief, the present invention relates to apparatus for projecting successive picture frames from a conventional film onto a second and wider film which moves transversely to the direction of movement of the conventional film. The movement of both films is intermittent and timed so that the successive picture frames which appear on the conventional film as a single row of transverse frames will be printed on the second film as a plurality of parallel rows with the direction of each frame extending longitudinally of the film. The apparatus comprises a stationary, more or less conventional projector portion, and means for advancing the second film being mounted on a vertically movable platform. Suitable drive means effect timed advance of both films in directions at right angles to each other and after completion of exposure of a row on the second film, means are provided for effecting a reversal of the direction of movement thereof and for raising the platform one step so that a second row of frames is exposed with the film moving in the opposite direction, to produce a second row below the previous row. Additional novel structural features will be described in more detail hereafter.

DESCRIPTION OF THE PREFERRED EMBODIMENT

The film shown in my prior application Ser. No. 619,499 is relatively wide, for example, about 70 mm. in width, and is provided with a row of perforations along each edge. The moving picture information thereon consists of twelve rows of picture frames extending longitudinally of the film, with the width of each frame also extending in a longitudinal direction. Thus, the picture frames of each row are in side-by-side relationship when referring to the "right" and "left" sides of the pictures. The action sequence of each row extends in a longitudinal direction opposite to that of the action sequence in adjacent rows. All twelve rows of picture frames are in parallel and adjacent relation, extending downwardly from near the top edge of the film. Near the other edge of the film are a corresponding number of sound tracks (not shown) but the present invention deals only with the production of the picture frames thereon. Moving pictures are conventionally taken with cameras wherein only a single row of picture frames is exposed and printed thereon, the individual frames extending laterally across the film. That is, the right and left sides of the scenes depicted are respectively adjacent the opposite edges of the conventional film.

Figures 2, 5:
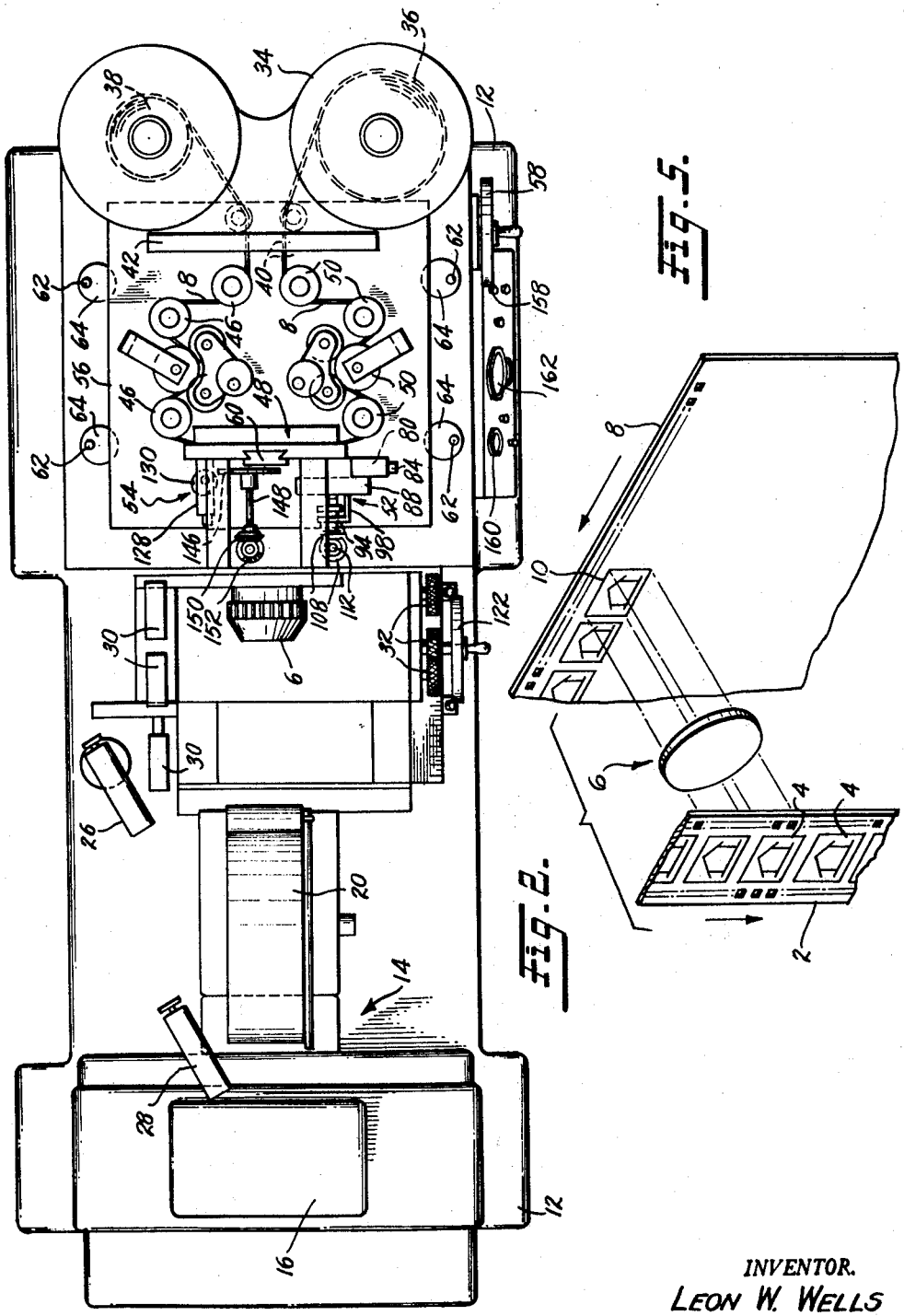
FIG. 2 is a top plan view of the apparatus shown in FIG. 1.
FIG. 5 is a schematic perspective view illustrating a basic principle of the invention.

Referring now to FIG. 5, numeral 2 schematically indicates a conventional film having the picture information appearing thereon in a single row of frames 4 and, as shown, the frames are arranged one above the other. The film, however, is intermittently moved downwardly to successively project the frames 4, by means of an optical system indicated at 6, onto the film 8 to be exposed. The film 8 is moved laterally, for example to the left, intermittently in step with downward movement of the conventional film 2. As will be described, suitable shutter means are provided so that the frames 4 of the conventional film are successively exposed on the film 8 in side-by-side relation to form a first row 10 of picture frames extending longitudinally of the film. In effect, the successive scenes are rotated 90° from the initial position relative to the length of film 2 to their position relative to the length of film 8. When a first row 10 has been exposed on the film 8, the film 8 is moved upwardly one step and its direction of drive is reversed so that succeeding frames on film 2 are then exposed along a second row below the row 10 with the action sequence extending in the opposite direction.

Figure 1:
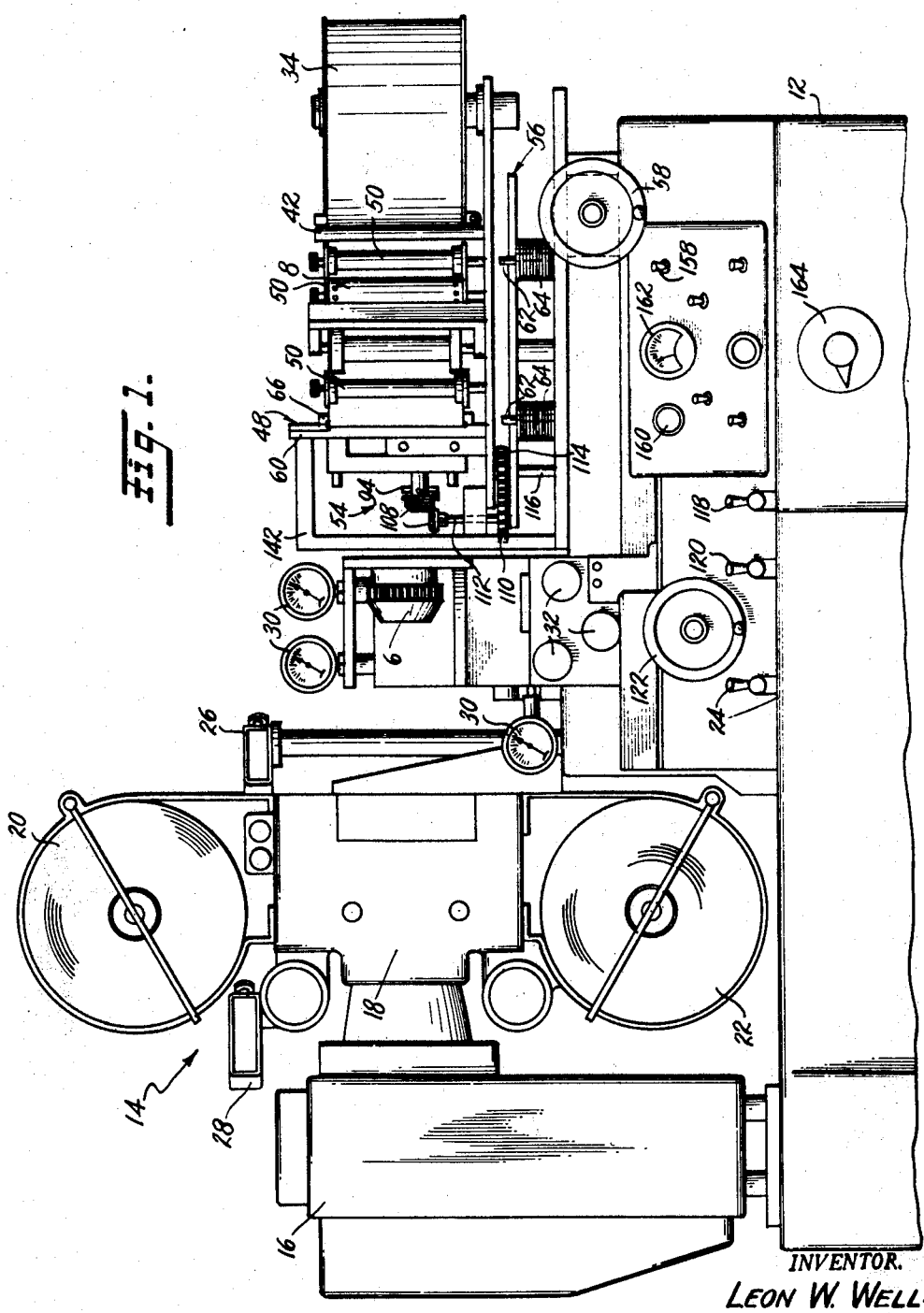
FIG. 1 is a schematic side view of an apparatus embodying the present invention, certain conventional features being omitted for clarity of illustration.

FIGS. 1 and 2 illustrate the major components of an apparatus for performing the functions described with reference to FIG. 5.

The machine comprises a suitable base 12 in which a drive motor and transmission means defining a main power source (not shown) are provided. Fixedly mounted on the base 12 is a conventional projection apparatus 14 comprising a housing 16 having a light source and light directing means therein, an intermittent pull-down mechanism is in the housing portion 18 of the conventional projector and intermittently pulls film downwardly from a supply reel in the portion 20 to a takeup reel in the portion 22. The conventional pulldown mechanism referred to is suitably connected to receive driving power from the main power source previously mentioned. The projector 14 projects successive images appearing on the conventional film therein through the optical system 6 which may comprise one or more lenses, of conventional construction, and known arrangement. A control lever 24 is provided for selectively reversing drive from the main power source to projector mechanism 14 and may take the form of any conventional reversing means. A counter 26 can be set to count the number of frames projected from the conventional film in projector 14 and a second counter 28 is arranged to count the number of frames exposed on the second film 8. The counter 28 will be reset to zero at the end of each row 10 and the counter 26 may operate continuously to show the total number of frames projected. Indicators 30 are provided to indicate various adjustments of the optical means 6, which adjustments may be performed by manipulating the control knobs 32, all of which are of conventional construction and need not be further described. The adjustments may include adjustments of the lens system 6 in each of three different directions, for focus, lateral position and vertical position.

The second film 8 is wound on one reel of a cartridge 34 having two compartments in one of which is the supply reel 36 and in the other of which is a takeup reel 38. It will be apparent, however, that each of the reels 36 and 38 function alternately as a takeup and/or supply reel. Suitable drive means are connected to the reels to cause the same to rotate in more or less conventional manner. The film 8 is directed from the supply reel 36 through an opening 40 in a positioning and masking member 42 for cartridge 34 and is then directed about suitable guide rollers 50 through a guide means 48 and thence around additional guide rollers 46 back through the opening 40 and onto takeup reel 38. In operation, a light excluding cover member will cover the portions of the film 8 outside the cartridge 34 but no cover is shown herein merely for the purpose of facilitating the description.

Suitable film advancing and holding mechanisms 52 and 54, which will be described in more detail later, are also provided for advancing the film 8 along its path of travel through the guide means 48, in timed relation to operation of the pulldown means in projector 14. The cartridge 34, the guide rollers 46 and 50, and the guide means 48, along with the film advancing and holding means 52 and 54, are all mounted on a platform 56, mounted for vertical movement relative to the base 12. Any suitable screw or jack structure may be employed to effect such vertical movement and it is contemplated that any such mechanism be manually operable, for example, by means of the hand wheel 58. It is to be noted that the mechanisms referred to are carried by and for movement vertically with the platform 56 but the optical system 6, a shutter 146 and an aperture or framing plate or strip 60 remain stationary relative to the base 12, all as will be more fully described later.

As shown, the base 12 is provided with a plurality of upstanding pins 62 on each of which is a plurality of shim plates or discs 64. The shim discs 64 may be selectively swung around the pins 62 to be completely clear of the platform 56, or may be positioned as shown in FIG. 2 so that any selected number thereof extend under the platform 56 and are capable of supporting the same a precisely controlled distance above the base 12. It is apparent, however, that a plurality of single blocks, each of different height, may be successively used for this purpose. This feature will be further described later.

Figure 3:
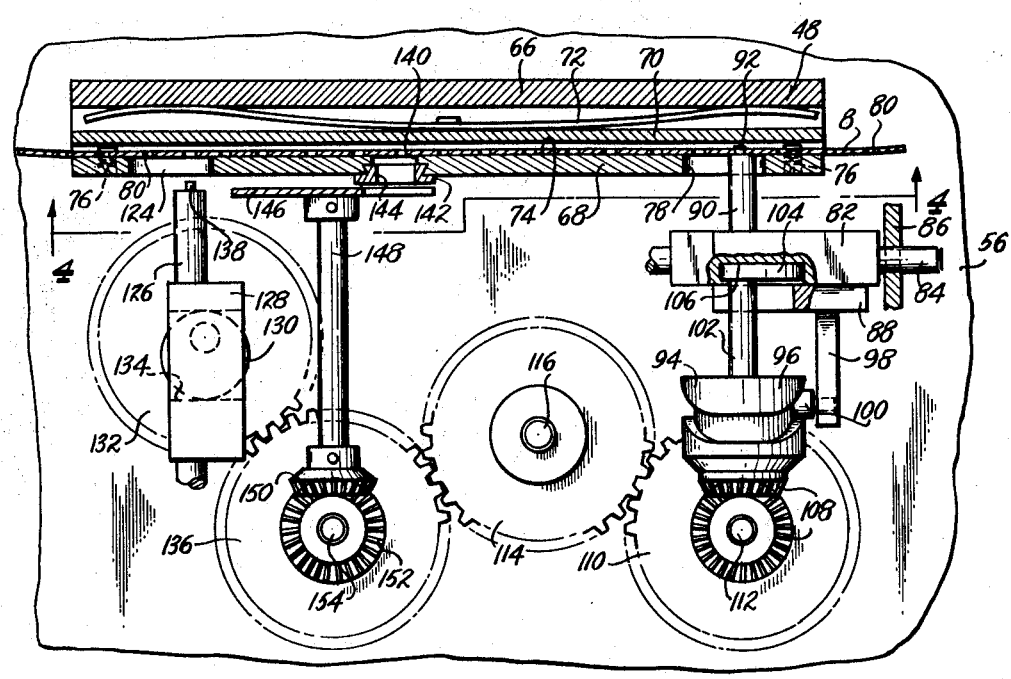
FIG. 3 is an enlarged schematic view of intermittent drive means for the second film.
Figure 4:
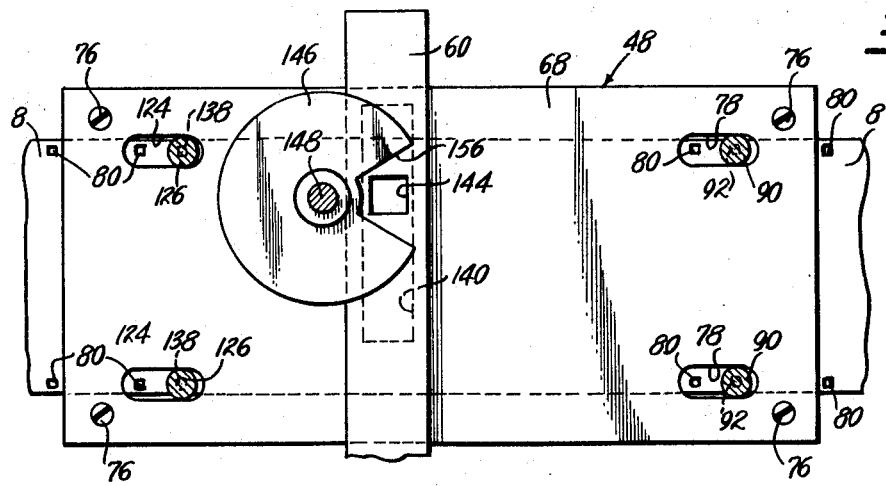
FIG. 4 is a sectional view taken along the line 4—4 of FIG. 3.

The guide means 48 and the film advancing and holding mechanisms 52 and 54 are more fully shown in FIGS. 3 and 4 and reference is now made thereto.

The guide means 48 comprises an upstanding plate 66 fixedly mounted on the platform 56 and to which a front plate 68 is secured in spaced relation. A pressure plate 70 is provided with suitable spring means 72 bearing against the plates 66 and 70 to normally urge the plate 70 forwardly toward film 8 extending through a suitable channel 74 in the plate 68. Adjusting screws 76 are threaded through plate 68 and function as stop means for the plate 70 so that the spacing between plates 70 and 68 may be accurately regulated to confine the film 8 only enough to prevent unwanted buckling or curvature thereof while leaving the same free to move readily through the channel 74. The plate 68 is provided with slots 78 therein, the slots being respectively aligned with the edge perforations 80 on film 8. An intermittent driving mechanism is also mounted on the platform 56 and comprises a first block 82 slidably mounted on pins 84 carried by suitable bracket means 86 on platform 56. A second block 88 has guide pins 90 fixed thereto and which extend slidably through the block 82. Thus, the blocks 82 and 88 are constrained to move together in a direction parallel to the movement of film 8, as controlled by the pins 84. However, the block 88 is free to move toward and from the film 8 from a forward position wherein reduced diameter pin means 92 on guide pins 90 project into edge perforations 80 of film 8 to a retracted position wherein they are clear thereof. Movement of the block 88 toward and from the film is produced by a barrel cam 94 having a peripheral cam groove 96 thereon. An extension 98 of block 88 carries a cam follower roller 100 engaging in groove 96. The cam 94 is mounted on a shaft 102 which also carries an eccentric cam 104 at its forward end, engaging in a vertical slot 106 in block 82. The shaft 102 is driven through bevel gears 108 from a drive gear 110. It will be apparent from FIG. 3 that rotation of the shaft 102 in a clockwise direction, as seen from the bottom of FIG. 3, will result in the cam 94 pulling rearwardly on the block 88 to disengage pin means 92 from the film 8 and continued rotation will cause the cam 104 to move blocks 88 and 82 to the left while pin means 92 remain retracted. At the left end of the throw of cam 104, cam 94 then projects the block 88 and pin means 92 forwardly to engage in the next adjacent perforations 80 and it remains in that forward position while the cam 104 then slides the assembly to the right to thus advance the film 8 one step. The cam 104 and cam groove 96 are so configured that the pin means 92 follow a substantially square closed path. It can be referred to as a closed orbital path and one portion thereof in coincident with the path of movement of the film 8.

The drive gear 110 is fixed to a shaft 112 and meshes with a gear 114 carried by a shaft 116. All of the mechanisms so far described are carried by and journalled on the platform 56, the gears 110 and 114 being between the spaced plates shown in FIG. 1 as defining the platform 56. The shaft 116 extends downwardly into the base 12 where a suitable sliding drive connection is made to the main power source previously referred to. Thus, the shaft 116 can move vertically with the platform 56 while maintaining its drive connection to the power source. The specific details of such a sliding connection are not shown herein since many such means are known and conventionally used in many environments. A further control lever 118 (FIG. 1) is provided to effect a reversal of drive between the power source and the shaft 116. Thus, while the power source continues to drive in one direction and continues to drive the film in projector 14 downwardly, the lever 118 can be manipulated to cause the mechanism just described to intermittently advance film 8 either to the right or to the left, as seen in FIG. 3. The machine is also provided with a further lever 120 whereby reversal of drive from the power source to both the projector 14 and the shaft 116 may be accomplished and for disconnecting both from the power source. The machine is also provided with a manually operable hand wheel 122 enabling an operator to manually rotate the power source when it is desired to move the film slowly only one step at a time, for a purpose to be described later.

Referring again to FIG. 3, the plate 68 is provided with additional openings 124 aligned with locking pins 126. The pins 126 are carried by a block 128 suitably guided for sliding movement toward and from the film 8 by means (not shown) carried by the platform 56. An eccentric cam 130, driven by a gear 132, engages in opening 134 of block 128 to effect cyclical reciprocation of the pins 126 toward and from the film 8. The gear 132 is driven by an intermediate gear 136 which in turn meshes with gear 114, previously described. The gear 136 is also journalled on the platform 56 for vertical movement therewith. The parts are so related that when the film-advancing pin means 92 are in engagement with the film 8, the pin means 138 are retracted from the film 8 when the pin means 92 are retracted from the film 8, the pin means 138 are advanced into engagement with aligned film openings 80 to thereby lock the film against any movement along guide channel 74 while the pin means 92 are completing their orbital movement to engage in another opening 80. Thus, the pin means 138 act as a locking means between intermittent steps of film advancement.

The plate 68 is also provided with a vertically extending slot 140 through which the images are projected by optical means 6 onto the film 8. The slot 140 extends the full height of the picture frame portion of film 8. The aperture plate or framing strip 60 slidably engages the plate 68 and covers the slot 140 except for the portion thereof exposed through a framing aperture 144 in the strip 60. As shown, the strip 60 interengages with the sides of the opening 140 by dovetail formations whereby to constitute an efficient, light-tight interengagement and thus prevent impingement of any stray light on the film 8 and insures exposing the latter only to light passing through the framing aperture 144. While the plate 68 moves vertically with platform 56, aperture strip 60 is suitably held in fixed relation to the machine base 12 by such means as the arm 142 (FIG. 1) so that the framing aperture 144 is always in proper and fixed alignment with the optical means 6.

A rotary shutter 146 is journalled on a fixed axis defined by shaft 148 which is rotatably mounted in fixed relation to the base 12. The mounting means for the shaft 148 are not shown, to simplify the illustration.

The shaft 148 is driven by a bevel gear 150 meshing with a further bevel gear 152 drivingly connected to the shaft 154 which carries intermediate gear 136. Thus, the shaft 154 is driven by gear 136. However, since the gear 136 moves vertically with platform 56 and shaft 148 does not move with the platform, it is necessary to provide a suitable splined driving connection between the shaft 154 and bevel gear 152. Such a connection, however, is well-known to those skilled in the art and need not be further described. The shutter 146 is, of course, opaque to light but is provided with a generally sector-shaped gate 156, as is customary. The drive connections are so related that the shutter 146 is "open" only when the conventional film 2 and wide film 8 are stationary and is closed at all other times, that is during movement of either film 2 or 8, or both.

An appropriate drive connection (not shown) from gear 114, for example, is provided to the reels 36 and 38 in cartridge 34.

For a complete understanding of the invention, the sequence of steps in a typical operation will now be described.

Let us assume that we have a sufficient length of 16 mm. sound film for a one-hour show, and we wish to transfer the picture therefrom into twelve rows of pictures on the wide film 8. First, we obtain the total frame count of the entire conventional film which in this case, at twenty-four frames per second, gives a total of 86,400 frames. This figure is divided by 12, which gives 7200 frames per row on film 8. The conventional film is then studied to locate an appropriate changeover point at somewhere near the frame number 7200. The length of the rows 10 on film 8 do not have to be of equal length so we select a point on the conventional film at the end of a scene or end of a sentence on the sound content as close as possible to frame number 7200 and we adopt that selected frame or point for changeover to the next row. For example, the best changeover point may appear at frame 7100 and we select that point to terminate the first row on film 8. Likewise, the next row could be more or less than 7200 frames but the changeover points must be selected so that the twelve rows will average 7200 frames per row. After proper changeover points for the end of each row are determined, a program sheet is made up stating the number of frames of action in each successive row. For example, if the first changeover occurs at frame numbered 7100 and the second row contains 7250 frames, the third row may contain 7400 frames, etc. This worksheet with the number of frames for each row is given to the operator of the step printer described herein. A similar sheet will be used for recording sound on the film but the present application is not concerned therewith and will describe only the picture printing. The conventional film is properly mounted in the projector 14 with frame No. 1 appearing at the projection station. Counters 26 and 28 are then set to indicate numeral 1 and the 70 mm. film in cartridge 34, and on reel 38, is mounted on and threaded through the machine to the reel 36 with that portion of the film 8 where the first row is to start being positioned directly behind the framing aperture 144. The manual elevating means is operated by turning wheel 58 to lower platform 56 to its lowest position, resting on the base 12 so that the upper portion of film 8 is behind framing aperture 144. The members 24, 118 and 120 are then set for the desired direction of movement of the described mechanisms and on-off switch 158 is manipulated to start the machine. The machine will then operate in the manner already described to expose successive frames from film 2 onto film 8 in the manner already described as long as the machine is permitted to run. It is to be remembered that a light-tight cover is at this time over at least all of the mechanism and film on platform 56.

The operator observes either counter 26 or 28 and when counter 26 indicates number 7100, the machine is stopped, preferably by moving the lever 120 to its "neutral" position. In order not to run past frame 7100, the machine can be stopped a few frames ahead of the desired number and the last few frames printed, a single frame at a time, by operating a suitable stepping button 160 provided for that purpose. On the other hand, the operator could turn crank 122 while watching counter 26 until the required number of frames had been printed. If the machine is not stopped soon enough and overruns and prints past frame 7100, this does not matter. A cue signal that will be placed on the sound track at frame 7100 will effect reversal of film 8 when it is being projected ultimately and the additional frames exposed thereon will have no effect. However, if the operator permits the machine to run past frame 7100, he will manually operate the machine in reverse and reset the counters 26 and 28 to number 7101, which is the first frame of the second row. At this time the operator may return counter 26 to read No. 1, while leaving counter 28 without resetting. In this manner the operator can constantly check on the number of frames printed by observing counter 28. After the first row is printed and before starting operation of the machine to print the second row, the lever 118 is operated to reverse the direction of drive to all the mechanisms on platform 56 and that platform is manually raised by handwheel 58 a distance preferably greater than the spacing between rows. He may then swing one of the discs 64 about each pin 62 so that at least a portion of one disc from each stack extends under the platform 56 adjacent each of the pins 62. Thereafter, he will manually lower the platform 56 until its entire weight is supported on the spacer discs 64 and this will accurately position the film 8 so that the beginning of the portion thereof to contain the second row of picture frames is directly behind framing aperture 144 and the platform will be stably held at that elevation with proper orientation. It is to be noted that the first frame of the second and all succeeding rows is directly below the last frame of the preceding row, even though each row may end where convenient without regard to the start of the row thereabove. The same sequence of steps is performed for each succeeding row until the entire film 8 has been exposed and all of the picture frames from film 2 exposed thereon. Thereafter, the cartridge 34 may be removed from the machine and the film then developed to produce a negative print from which positive prints can be made for ultimate distribution.

If the film 2 comprises color pictures, color correction is often desirable. This is easy to achieve since the machine can be stopped at any time and will always stop with the shutter 146 closed whereupon suitable filters may be inserted in the optical system to perform the desired color correction.

As shown in FIG. 1, the machine is also provided with a volt meter 162 to indicate the voltage applied to the conventional lamp in housing 16 which voltage can be manually controlled by operation of rheostat 164, whereby the operator may accurately control the light intensity of the image projected onto film 8.

While a single specific embodiment of the invention has been shown and described herein, the same is merely illustrative of the principles of the invention and other embodiments may be resorted to within the scope of the appended claims.

I claim:

1. Optical printing apparatus for printing from a first conventional film onto a wider second film, the first film having a single row of picture frames extending the length thereof with each frame extending laterally across, comprising: a base; first means for intermittently advancing said first film in one direction along a first path to project images of successive frames along an optical axis, said first means being mounted in fixed position on said base with said first path extending substantially vertical and said optical axis being substantially horizontal; second means for intermittently moving said second film along a second path transverse to said first path and crossing said optical axis whereby to expose, along the length of said second film, a row of picture frames, each of which extends longitudinally of said second film; said second means including a vertically moveable platform on said base; means for selectively moving said platform vertically through predetermined steps to carry said second film transversely of said second path and said optical axis; and means for reversing the direction of travel of said second film along its path whereby to expose additional rows of picture frames thereon, parallel to and adjacent to a succeeding row, with the action sequence of each adjacent row progressing in the opposite direction.

2. Apparatus as defined in claim 1 wherein said last-named means comprises means for manually raising and lowering said platform relative to said base and block means positionable between said platform and base for supporting said platform an accurately predetermined distance above said base.

3. Optical printing apparatus for printing from a first conventional film onto a wider second film, the first film having a single row of picture frames extending the length thereof with each frame extending laterally across, comprising: first means for intermittently advancing said first film in one direction along a first path to project images of successive frames along an optical axis; second means for intermittently moving said second film along a second path transverse to said first path and crossing said optical axis whereby to expose, along the length of said second film, a row of picture frames, each of which extends longitudinally of said second film, said second means including a plate moveable transversely of said optical axis with said second film and having an opening therethrough embracing said optical axis; an aperture member having a picture framing aperture therethrough, means mounting said aperture member in fixed relation to said optical axis the latter passing therethrough, said aperture member covering said opening and slidably interengaging said plate with light-tight interengagement; and means for reversing the direction of travel of said second film along its path and for moving the same transversely of said second path and said optical axis whereby to expose a second row of picture frames thereon, parallel to said first row and with the action sequence thereof progressing in the opposite direction.

4. Apparatus as defined in claim 3, wherein said second film includes edge perforations; and said second means for intermittently moving said second film includes a first block slidably mounted for reciprocation parallel to said second film path, a second block slidably mounted on said first block for reciprocation thereon toward and from said second film path, pin means on said second block for engagement in said edge perforations in said second film, and cam means for alternately sliding said first and second blocks to cause said pin means to trace a substantially square orbital path one side of which coincides with said second film path.

5. Apparatus as defined in claim 3, wherein means are provided for intermittently advancing and holding said second film in said second film path; said means including first pin means and first means for moving the same in a closed orbital path one portion of which coincides with said second film path, second pin means and second means for reciprocating the same laterally toward and from said second film path, and means for actuating said first and second means in such timed relation that said first and second pin means alternately respectively advance said second film along said second film path and then hold the same against movement along said second film path.

References Cited

UNITED STATES PATENTS

| 1,844,377 | 2/1932 | Ball | 352—44 |
| 2,179,617 | 11/1939 | Dilks | 355—18 |
| 3,194,112 | 7/1965 | Back | 355—54 XR |

FOREIGN PATENTS

| 9,262 | 4/1909 | England. |

NORTON ANSHER, Primary Examiner

L. H. McCORMICK, Jr., Assistant Examiner

U.S. Cl. X.R.

352—44